United States Patent [19]

Koerner et al.

[11] Patent Number: 5,307,633
[45] Date of Patent: May 3, 1994

[54] LOW CARBON PARTICLE PRODUCING GAS TURBINE COMBUSTOR

[75] Inventors: Michael Koerner, Harbor City; Scott Goldberg, Westminster; Naaman Midyette, Torrance, all of Calif.

[73] Assignee: Allied-Signal, Inc., Morris Township, Morris County, N.J.

[21] Appl. No.: 876,343

[22] Filed: Apr. 30, 1992

[51] Int. Cl.⁵ ............................................. F02C 3/14
[52] U.S. Cl. ..................................... 60/727; 60/722; 60/733
[58] Field of Search ............... 60/39.07, 39.27, 39.33, 60/39.5, 722, 727, 733

[56] References Cited

U.S. PATENT DOCUMENTS

| | | | |
|---|---|---|---|
| 2,611,239 | 9/1952 | Briggs | 60/39.27 |
| 2,839,892 | 6/1958 | Rosenthal | 60/39.5 |
| 4,242,863 | 1/1981 | Bailey | 60/39.06 |
| 4,718,238 | 1/1988 | Todd et al. | 60/733 |
| 4,777,793 | 10/1988 | Weigand et al. | 60/39.142 |
| 4,898,000 | 2/1990 | Weigand et al. | 60/740 |
| 4,934,136 | 6/1990 | Weigand et al. | 30/39.03 |

Primary Examiner—Louis J. Casaregola
Attorney, Agent, or Firm—James W. McFarland; Robert A. Walsh

[57] ABSTRACT

A combustion system for a gas turbine engine provides a reaction limiting means for preventing the combustion process within the combustion chamber of the engine from proceeding towards completion by limiting the reaction rate or duration of the reaction process sufficiently such that a clean combustion gas is produced having substantially less carbon particles than for a combustor effective for essentially complete combustion. The invention also provides an efficient method of removing carbon deposits which do form by controlling the combustor shutdown technique in such a way as to cause the carbon to be oxidized. The preferred embodiment provides an aircraft emergency power unit having a high pressure air storage tank, an aviation fuel storage tank, and a combustor with a reaction limiting means which combusts pressurized air and aviation fuel in a fuel rich ratio to produce a motive combustion gas in a reaction limiting means.

12 Claims, 2 Drawing Sheets

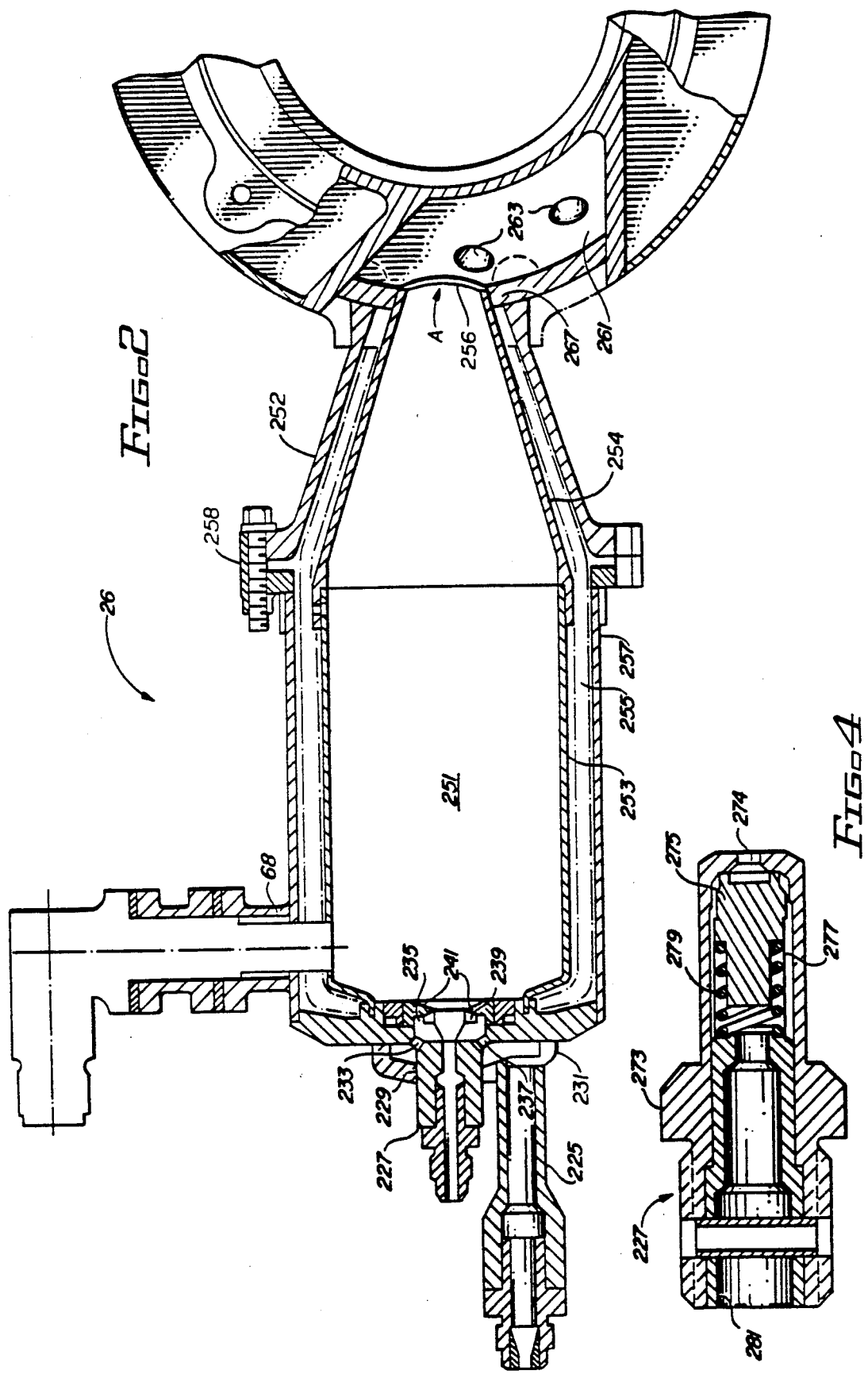

LOW CARBON PARTICLE PRODUCING GAS TURBINE COMBUSTOR

BACKGROUND OF THE INVENTION

1. Field of the Invention

This invention relates to a gas turbine combustor and a method for operating such a combustor so that the exhaust products flowed to a turbine will be relatively free of carbon particles. More specifically, this invention provides a combustor for a stored energy subsystem using aviation fuel and compressed air for burning a fuel rich mixture to yield a controlled, high temperature, high pressure gas whereby apparatus and method are provided for preventing the reaction from reaching completion.

2. Description of Related Art

Generally, an aircraft has one or more primary engines which provide thrust for the aircraft, as well as pressurized bleed air for the environmental control systems. The primary engine also provides power to drive electric generators and hydraulic pumps, both of which are necessary for powering instruments and flight control systems. In addition, many aircraft also have an auxiliary power engine to provide electric and hydraulic power, as well as bleed air to the aircraft when the primary engines are not operating, for example when the aircraft is on the ground. The auxiliary power engine may also provide power to start the primary engines either on the ground or in flight. Both the primary engine and the auxiliary power engine operate on aviation fuel from the aircraft's main fuel tanks, mixed with air drawn from the atmosphere as the combustion components. For maximum fuel efficiency, these engines operate in an air rich, fuel lean mode. In many instances, starting the auxiliary power engine requires an external power source such as a ground based start cart, a pressurized air tank, or an emergency power system. Since the auxiliary power engine is primarily designed to operate on the ground where the air is relatively dense, the auxiliary power engine may be incapable of operating at higher elevations, for example above 55,000 feet. It is therefore evident that in many applications the auxiliary power engine would not be able to restart a failed primary engine above 55,000 feet, and in this event there would be no electrical or hydraulic power available. Also, since both the primary engine and the auxiliary power engine operate on fuel from the main fuel tanks, if this fuel supply is depleted there will be no source of power for the electrical and hydraulic power systems to allow the pilot to control and land the aircraft.

It is therefore desirable to have on an aircraft an emergency power system capable of operating independent of external conditions which can provide emergency electrical and hydraulic power to the flight control systems and may be used to restart the auxiliary or primary engines. These are the minimum requirements of the emergency power system. Since they are only operated in the event of an emergency, these systems remain stored and inactive for long periods of time, but are required to start instantly and provide continuous power output for a prespecified duty cycle. Ideally, such an emergency power system would be compact, lightweight, highly reliable, easily maintained, require no special handling of materials or fuels, while providing a combustion process which is controllable and which produces a clean, combustion gas. Presently, emergency power units primarily rely on liquid hydrazine based fuels sprayed into a catalyst bed to generate a pressurized gas. These units are in use on several aircraft and combine high performance with low weight.

However, liquid hydrazine is highly corrosive and toxic, thereby requiring special handling procedures and design considerations. The catalyst material is expensive, and when the catalyst is depleted it must be replaced. Further, the combustion gas which is produced is toxic and therefore limits ground testing of the emergency power unit.

To overcome such problems emergency power systems were designed to operate on a fuel rich mixture of aviation fuel and air which optimizes the advantages of such a system to yield an emergency power system with the improved characteristics of relying on an energy source which is readily available, non-toxic, and clean burning, packaged in a compact, lightweight, highly reliable, and easily maintained emergency power unit.

Such an emergency power system is disclosed in U.S. Pat. No. 4,777,793 entitled "Emergency power unit" and its divisional U.S. Pat. Nos. 4,934,136 entitled "Method of Operating an Emergency Power Unit" and 4,898,000 entitled "Combustor for an Emergency Power Unit" assigned to the present assignee.

A problem with using carbon based jet fuels such as contemplated for the present invention is that in a fuel rich environment formation of solid particles occur, generally comprised of carbon, suspended in the combustion product gas flow. These particles pose a significant problem effecting the gas turbine's operation, durability, and reliability because it can cause erosion of gas nozzles and turbine blades as well as clog gas passages downstream of the combustor.

SUMMARY OF THE INVENTION

The present invention provides a combustor and method for burning aviation fuel in a gas turbine engine such as an emergency power system operating on a fuel rich mixture of aviation fuel and air, to significantly reduce or substantially prevent the formation of solid particles in the combustion product gas flow.

Briefly, the invention provides a gas turbine engine combustor for use in a fuel rich combustor environment and methods for limiting the degree to which the combustion reaction proceeds towards completion. Four particular techniques including apparatuses and methods are contemplated by the present invention which individually and in combination may be used to limit the degree to which the combustion reaction proceeds towards completion.

The first technique reduces the characteristic length of the combustor, the second decreases the combustion gas temperature, the third decreases the combustion pressure, and the fourth increases the fuel droplet size relative to those values generally used for complete combustion.

The invention also presents a method of removing carbon deposits once they have formed. This method consists of oxidizing the carbon by shutting off the flow of fuel prior to shutting off the flow of air when terminating combustor operation.

The present invention provides a light weight gas turbine combustor for operation in a fuel rich environment such as in an aircraft EPU that substantially reduces the formation of solid particles in the combustion product gas flow. Another advantage of the present invention is that it can be easily adapted for use with existing combustors and EPU systems.

These and other advantages of the present invention are specifically set forth in, or will become apparent from the following detailed description of a preferred embodiment of the invention when read in conjunction with the accompanying drawings.

BRIEF DESCRIPTION OF THE DRAWINGS

The foregoing aspects and other features of the invention are explained in the following description, taken in connection with the accompanying drawing where:

FIG. 2 is a partially schematic partially cross-sectional view of the emergency power unit combustor.

FIG. 4 is a partially cross-sectional view of the fuel nozzle of the combustor of the emergency power unit.

DETAILED DESCRIPTION OF THE INVENTION

The present invention illustrated herein provides a means, both methods and apparatuses, to prevent the combustion process of a gas turbine engine combustor, preferably operating with a fuel rich mixture, from proceeding towards completion by limiting at least one combustor reaction rate parameter, either the duration or speed of the reaction process or both, sufficiently such that a clean combustion gas is produced having substantially less carbon particles than are produced in a combustor designed for essentially complete combustion. One way to measure cleanliness of the combustion process with respect to carbon particles is to measure its opacity. A substantially clean combustion gas should have an opacity of about 20% or lower and combustors operating in a regime with opacity much greater than 20% results in excessive carbon formation as an exhaust product.

Figure 1:
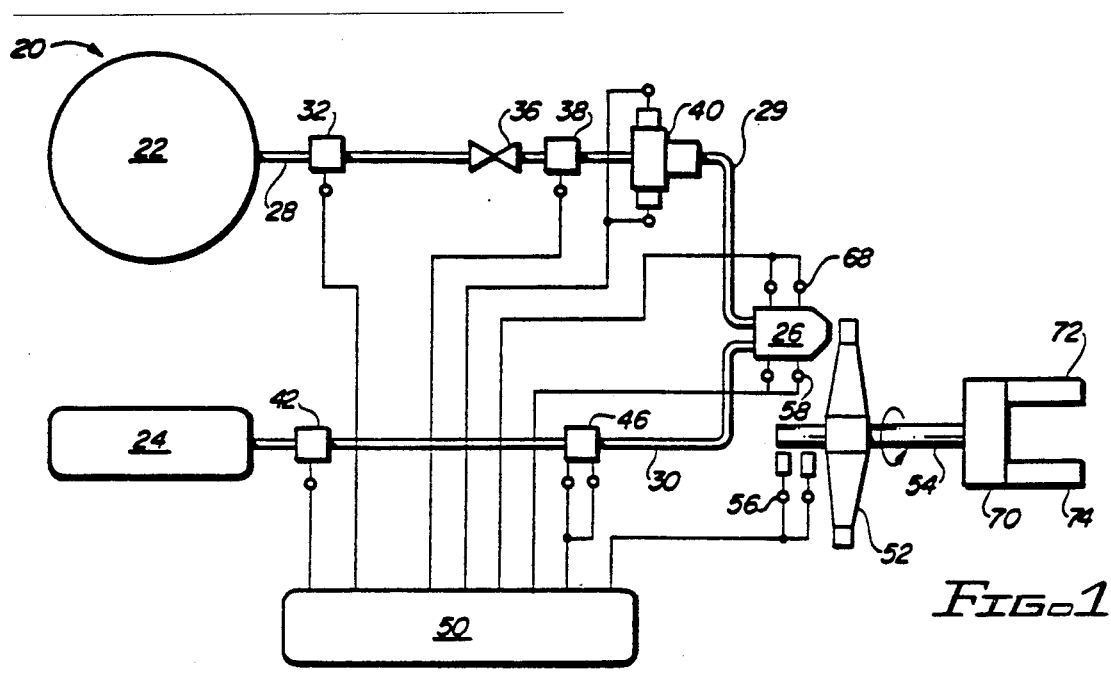
FIG. 1 is a schematic diagram of the emergency power unit embodying the principles of the present invention.

Illustrated in FIG. 1 is an emergency power unit 20 having a high pressure air tank 22 and an aviation fuel tank 24 as stored energy means. Air tank 22 is connected via a high pressure air line 28, an air pressure regulator 36, and a regulated pressure line 29 to a combustor 26. Air line 28 also includes an air shutoff valve 32, while regulated pressure air line 29 includes an air temperature sensor 38 and an air flow control valve 40. Similarly, fuel line 30 between fuel tank 24 and combustor 26 includes a fuel shutoff valve 42, and a fuel control valve 46. An electrical controller 50 for emergency power unit 20 is electrically connected to air shutoff valve 32, air temperature sensor 38, airflow control valve 40, fuel shutoff valve 42, fuel control valve 46, as well as being electrically connected to an igniter 68, a pair of combustor temperature sensors 58, and a turbine speed sensor 56. Turbine speed sensor 56 is in relative proximity to, and senses the speed of an output shaft 54 which is attached to a turbine 52 which is driven by the combustion gases produced within combustor 26. Output shaft 54 from turbine 52 is connected to a gearbox 70 to drive a generator 72 and an hydraulic pump 74.

Downstream of turbine 52, the combustion gases are exhausted through an exhaust duct 60.

Prior to operation, high pressure air tank 22 is filled to several thousand p.s.i. with compressed air and fuel tank 24 is filled with aviation fuel. Fuel tank 24 may be a positive displacement pressurized piston or bladder type of fuel tank. When emergency power is required, controller 50 opens air shutoff valve 32 and fuel shutoff valve 42 to start the flow of air and fuel through respective air line 28 and fuel line 30. Subsequently, air coming from high pressure air tank 22 is delivered to pressure regulator 36 which reduces the air pressure to an appropriate regulated pressure level controlled by controller 50.

Controller 50 also uses the air temperature signal from air temperature sensor 38 to direct air flow control valve 40 and fuel control valve 46 to deliver a precise fuel to air ratio to combustor 26 at desired pressures. The fuel and air mix within combustor 26 and igniter 68 commences the combustion process. Once initiated, combustion is self-sustaining as long as fuel and air are delivered to the combustor.

Controller 50 powers and controls igniters 68, and receives input back from combustor temperature sensors 58, and turbine speed sensors 56 to combine with the air and fuel temperature measurements in order to optimize the performance and efficiency of the emergency power system, while regulating the turbine speed to a nominal, normally very high speed by adjusting fuel and air flow rates to combustor 26.

It may be appreciated that as the compressed air supply within high pressure air tank 22 is depleted, the temperature of the remaining air drops rapidly. Thus, controller 50 must continuously monitor the regulated air temperature and the fuel temperature, which is also subject to variation, in order to properly modulate the fuel to air ratio delivered to combustor 26.

The desired air to fuel ratio is in the fuel rich range of between 1.4:1 and 3.8:1 by weight to produce a combustion gas having a temperature between 1100° and 2000° F. The optimum air to fuel ratio for the present system is approximately 2.9:1, producing a combustion gas having a temperature of 1650° F. The combustor 26 illustrated herein is designed to operate with good controllability throughout a chamber pressure range of 700 to 140 psia. Temperature and pressures are maintained by controller 50 as explained above. Prior designs were made to operate at an air to fuel ratio of 3.5:1 to produce a desired combustion gas temperature of 1850° F.

Combustor 26 of FIG. 1 is shown in a more detailed cross-sectional view in FIG. 2. A combustion chamber 251 having a conical section 252 is enclosed by a generally cylindrically shaped thermal liner 253 and a conical liner 254 which tapers down at its exit 256, having a circular exit area A, to an attachment 267 of a nozzle box 261. Thermal liner 253 is wrapped in ceramic insulation 255 and enclosed by a pressure shell 257. The volume of combustor 26 is generally defined by combustion chamber 251. The characteristic length of a combustor such as combustor 26 is defined as the volume divided by its exit area which is A in the illustration of FIG. 2.

The present invention provides for a means for limiting the degree to which the combustion reaction in combustion chamber 251 proceeds toward completion. One technique for doing so is to limit the duration of the reaction process. The duration is often referred to as the residence time of the reaction, which is the average time reactants are within the combustion chamber. Residence time can be reduced by reducing the volume of a combustion chamber relative to its exit area or conversely as illustrated herein increasing the exit area relative to the combustion chamber volume. The volume of a combustion chamber divided by the area of its exit nozzle is referred to as the characteristic length of the combustor L*. By reducing the characteristic length L* of a fuel-rich combustor sufficiently to prevent the combustion reaction from reaching completion then, the gas cleanliness of the combustion gases can be improved.

Figure 3A:
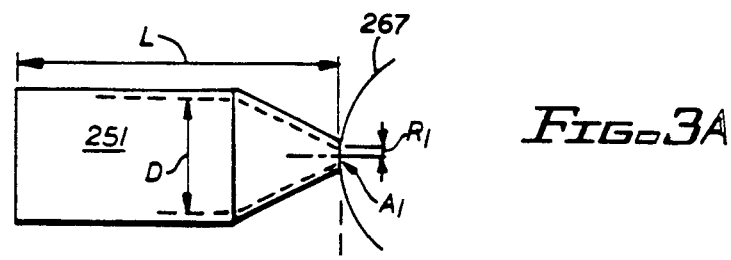
FIG. 3A is a diagrammatic cross-sectional view of an emergency power unit combustor illustrating the prior art.
Figure 3B:
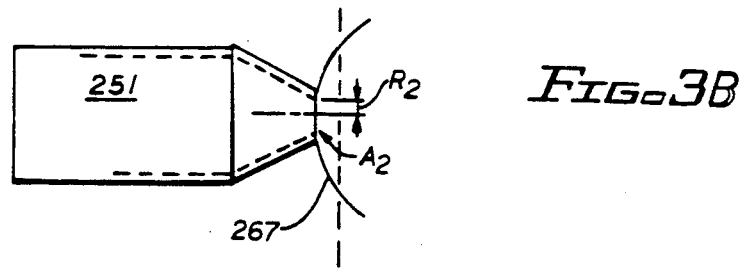
FIG. 3B is a diagrammatic cross-sectional view of an emergency power unit combustor illustrating one embodiment of the present invention.

FIGS. 3A and 3B illustrates a means by which L* of combustor 26 can be reduced without decreasing cylindrical diameter D and length L of combustion 251. This is a highly desirable embodiment of the present invention for retrofitting or modifying existing designs, particularly for existing combustors for which operating conditions are well known. A prior art combustor, i.e. one that permits the combustion's reaction to substantially proceed to completion, is illustrated in FIG. 3A. FIG. 3B illustrates how, by increasing the exit area without proportionally decreasing the volume of combustion chamber 251, L* may be substantially decreased such as by a factor of 3. By way of example exit area $A_2$ of FIG. 3B is three times larger than the exit area $A_1$ in FIG. 3A, the diameter and radius $R_2$ of exit area $A_2$ are 1.788 times as large as the diameter and radius $R_1$ of exit area $A_1$, and therefore L* is one third as long.

Referring back to FIG. 2, the opposite end of combustion chamber 251 is enclosed by an injector head 231 which has attached thereto a plenum cover 229 and an injector assembly 227. Attached to plenum cover 229 is an air inlet assembly 225 which delivers air to an outer air plenum 233 enclosed by plenum cover 229. A plurality of air passages 237 in injector head 231 deliver air from outer air plenum 233 to an inner air plenum 235. An air swirler 239 mounted to injector head 231 includes a plurality of vanes 241 deflecting the air as it passes from inner air plenum 235 into combustion chamber 251. Injector assembly 227 of FIG. 2 as shown in FIG. 4 includes a nozzle body 273, a tangential poppet 275, a filter screen 277, a compression spring 279 and a cylindrical insert 281.

Combustor 26 is specifically designed to promote the mixing of fuel and air as it enters combustion chamber 251, ignite the mixture, and maintain the combustion process for extended periods of time without excessive carbon deposit buildup or melting of the combustor body. Aviation fuel flows to injector assembly 227 through the center of insert 281 within nozzle body 273 and is strained by filter screen 277 before flowing around a tangential poppet 275 held in place by wire compression spring 279. The aviation fuel flows out through an opening 274 at the end of nozzle body 273. Simultaneously, air flows through air inlet 225 into outer air plenum 233 where it is distributed circumferentially about injector assembly 227 before flowing through air passages 237 into inner air plenum 235 whereupon vanes 241 of air swirler 239 deflect the air and fuel mixture as it enters combustion chamber 251.

One technique contemplated by the present invention to improve gas cleanliness is to increase the size of the fuel spray droplets produced by injector assembly 227. Larger droplets have less surface area for a given volume of fuel. The smaller surface area increases the time required to vaporize the fuel for the combustion process. Properly designing the size of opening 274 using well known analytical, empirical, or semi-empirical techniques can provide a means for limiting the degree to which the combustion reaction in combustion chamber 251 proceeds toward completion by reducing the reaction rate of the combustion process.

Injector assembly 227 can be designed such as by sizing opening 274 to produce fuel droplet sizes larger than those for which would be produced for a combustion process which proceeds essentially to completion and is sufficiently large enough to reduce the reaction rate of the combustion process so that the process is sufficiently prevented from proceeding towards completion so that it produces substantially less carbon particles.

A spark from igniter 68 commences the combustion process. The thermal liner 253 rapidly heats up to approximately the combustion temperature. Ceramic insulation 255 prevents the conduction of heat to pressure shell 257 such that during the limited duration of normal operation the temperature of pressure shell 257 does not exceed 500° F. while thermal liner 253 may obtain temperatures up to 1800° F. The combustion gases then flow out of combustor 26 into nozzle box 261. Nozzle box 261 distributes the combustion gases through one or more nozzles 263 to impinge upon turbine 52, and provide a motive force to turbine 52 causing turbine 52 to rotate about output shaft 54 and thus drive generator 72 and/or hydraulic pump 74.

The unique design of the walls of combustor 26 promotes and stabilizes the combustion flame while minimizing the weight of the combustor system. Thermal liner 253 which is made of Inconel steel and has a very thin cross-section, rapidly heats up to the temperature of the combustor flame. Once thermal liner 253 has heated sufficiently hot thermal liner 253 tends to stabilize the combustion process which is self-sustaining. Ceramic insulation 255, which is made of woven ceramic cloth and ceramic fiber mat, prevents the conduction of heat to pressure shell 257, which is also made of Inconel steel, and thereby minimizes the thickness of the cross-section of pressure shell 257 which is required to contain the combustion pressures. A further benefit of operating thermal liner 253 at combustion temperatures is that it effectively prevents the buildup of carbon deposits on the walls of combustion chamber 251.

Another technique is to decrease the combustion chamber pressure. Lower chamber pressures result in lower gas densities and less molecular interaction between gases. This reduction in molecular interaction decreases the rate of the chemical reactions, this limiting the degree of completion of the reaction and improving gas cleanliness.

Each of these factors limits the degree to which the reaction is carried to completion, and thus decreases the amount of carbon formed.

Clean burning fuel-rich combustors can be used to generate combustion gases to drive turbines in systems which produce some combination of pneumatic, electric, hydraulic or mechanical power; the combustion gases can be used directly to generate thrust or pneumatic power; or the fuel-rich combustion gases can be used as a fuel, for example as a fuel for the second stage in a two-stage combustion process.

Applications for clean-burning fuel-rich combination include aircraft systems, systems for other vehicles and stationary systems. Specific examples of applications which are currently under consideration include aircraft main engine start systems, aircraft auxiliary power unit start systems, and aircraft emergency power systems.

The present invention provides clean-burning fuel-rich combustion systems that can be adapted for use with any hydrocarbon fuel. The present invention contemplates the use of fuels other than jet fuel as illustrated herein. The fuel can be supplied from a dedicated fuel system or, alternately, from any available fuel supply. A dedicated fuel system might consist of a gas-pressurized fuel tank using free-surface expulsion, or a bladder or piston expulsion device. An aircraft's primary fuel system is an example of an available fuel supply which might alternately be used. A fuel pump may be used to obtain the desired combustor fuel inlet pressure when using these sources of fuel.

In order to increase the number of starts that can be made between cleaning intervals with a JP fuel and air combustion system such as in the present invention, a combustor shutdown technique is used that cleans the turbine inlet nozzles 263 shown in FIG. 2 after each run. Referring to FIG. 1, upon system shutdown, the preferred embodiment uses controller 50 to signal fuel shutoff valve 42 to shutoff the fuel flow while air shutoff valve 32 remains open. With this shutdown sequence, the high temperatures of combustor 26 that exist after operating the combustor, together with the oxygen available in the air flow act together to oxidize the carbon that is built up around nozzle inlets 263. This substantially allows the total nozzle area to be restored after each run and the unit's maintenance cleaning interval is significantly increased.

While a number of specific embodiments of the present invention presented herein have been described fully in order to explain the invention's principles, it is understood that the invention is not to be construed as being limited thereto and that various modifications or alterations may be made to the described embodiments without departing from the scope of the invention as set forth in the appended claims.

We claim:

1. A combustion system for a gas turbine engine that employs an aviation fuel supply and an oxidizer supply, said combustion system comprising;
    a combustor operable to burn a fuel rich mixture of aviation fuel and oxidizer,
    a combustion chamber within said combustor, and
    a reaction limiting means for preventing the combustion process within said combustion chamber from proceeding towards completion by limiting at least one combuster reaction rate parameter of a set of combustor reaction rate parameters sufficiently such that a clean combustion gas is produced having substantially less carbon particles than for a combustor effective for allowing its combustion reaction to essentially proceed to completion, said set of parameters comprising the duration of the reaction process and the speed of the reaction process.

2. A combustion system as claimed in claim 1 wherein said reaction limiting means comprises said combustion chamber having a characteristic length, L*, generally defined as the volume of said combustion chamber divided by its exit area, and wherein said L* of said combustion chamber is substantially smaller than required for allowing its combustion reaction to essentially proceed to completion.

3. A combustion system as claimed in claim 1 wherein said reaction limiting means comprises a temperature control means for operating said combustor at a temperature which is substantially lower than for essentially complete combustion.

4. A combustion system as claimed in claim 2 further comprising said reaction limiting means having a temperature control means for operating said combustor at a temperature which is substantially lower than that used for essentially complete combustion and said combustor having a means for operating said combustor at fuel rich levels.

5. A combustion system as claimed in claim 1 wherein said reaction limiting means comprises a fuel droplet producing means for producing fuel droplets that are generally substantially larger than those produced for essentially complete combustion.

6. A combustion system as claimed in claim 1 wherein said reaction limiting means comprises a means to operate said combustor at a pressure which is substantially lower than that used for essentially complete combustion.

7. A combustion system as claimed in claim 4 wherein said reaction limiting means further comprises a means to operate said combustor at a pressure which is substantially lower than that used for essentially complete combustion.

8. A combustion system as claimed in claim 4 wherein said temperature control means includes a combustor controller programmed for receiving a temperature signal from a combustor temperature probe and controlling a fuel flow to said combustor.

9. A combustion system as claimed in claim 8 wherein said temperature control means further comprises an oxidizer control system for controlling an oxidizer fuel flow to said combustor.

10. An EPU combustion system for an emergency power unit (EPU) powered by a gas turbine, said EPU combustion system comprising;
    a combustor effective for operating at fuel rich levels, said combustor comprising;
    a thermal liner defining a combustion chamber having openings at opposite ends thereof,
    a pressure shell enclosing said thermal liner,
    an insulator disposed between said thermal liner and said pressure shell, said insulator allowing said thermal liner to obtain a temperature approximating the combustion temperature, while inhibiting heat transfer to said pressure shell whereby said shell operates at a greatly reduced temperature,
    means for initiating the combustion process within said combustion chamber, and
    an injection head secured to said thermal liner in an arrangement sealing one of said openings of said combustion chamber, said injection head configured and arranged to deliver oxidant and fuel to said combustion chamber,
    means for receiving pressurized air attached to said injection head,
    means for receiving aviation fuel attached to said injection head,
    first air plenum disposed radially around said means for receiving aviation fuel and in open communication with said means for receiving pressurized air such that said first air plenum distributes said pressurized air radially around said means for receiving aviation fuel,
    a second air plenum disposed radially around said means for receiving aviation fuel in series with said first air plenum, a plurality of air flow passages between said first air plenum and said second air plenum, a second plurality of air flow passages extending through said injection head between said second air plenum and said combustion chamber, and an aviation fuel passageway extending from said means for receiving aviation fuel to said combustion chamber; and a reaction limiting means for preventing the combustion process within said combustion chamber from proceeding towards completion by limiting at least one combustor reaction rate parameter of a set of combustor reaction rate parameters sufficiently such that a clean combustion gas is produced having substantially less carbon particles than for a combustor effective for allowing its combustion reaction to essentially proceed to completion, said set of parameters comprising the duration of the reaction process and the speed of the reaction process.

11. An EPU combustion system as claimed in claim 10 further comprising a controller for controlling a fuel flow to said combustor, and wherein said reaction limiting means further comprises;

said combustion chamber having a characteristic length, $L^*$, generally defined as the volume of said combustion chamber divided by its exit area, and wherein said $L^*$ of said combustion chamber is substantially smaller than for essentially complete combustion, and a temperature control means for operating said combustor at a temperature which is substantially lower than for essentially complete combustion.

12. An EPU combustion system as claimed in claim 11 further comprising a combustor controller programmed to shutoff the fuel flow to said combustor upon combustor system shutdown while oxidizer is allowed to continue to flow for a sufficient enough time to allow carbon deposits in a turbine inlet of the gas turbine to be oxidized.

* * * * *